M. H. FLYNN.
CLUTCH OPERATING MECHANISM.
APPLICATION FILED JAN. 15, 1914.

1,180,709.

Patented Apr. 25, 1916.
4 SHEETS—SHEET 1.

WITNESSES:
L. L. Browning
Florence Meisner

INVENTOR
Michael H. Flynn
BY
Edward C. Davidson
ATTORNEY

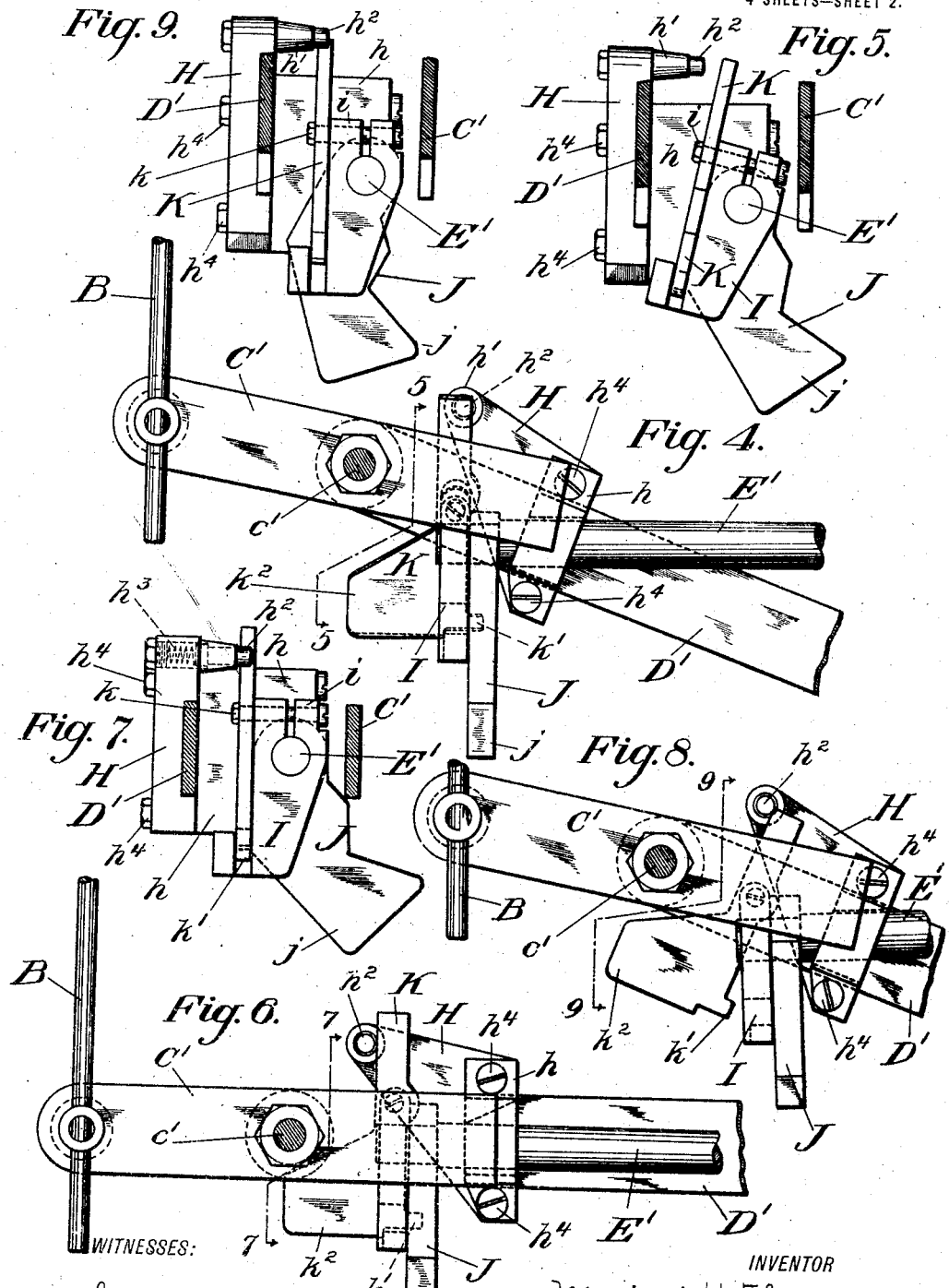

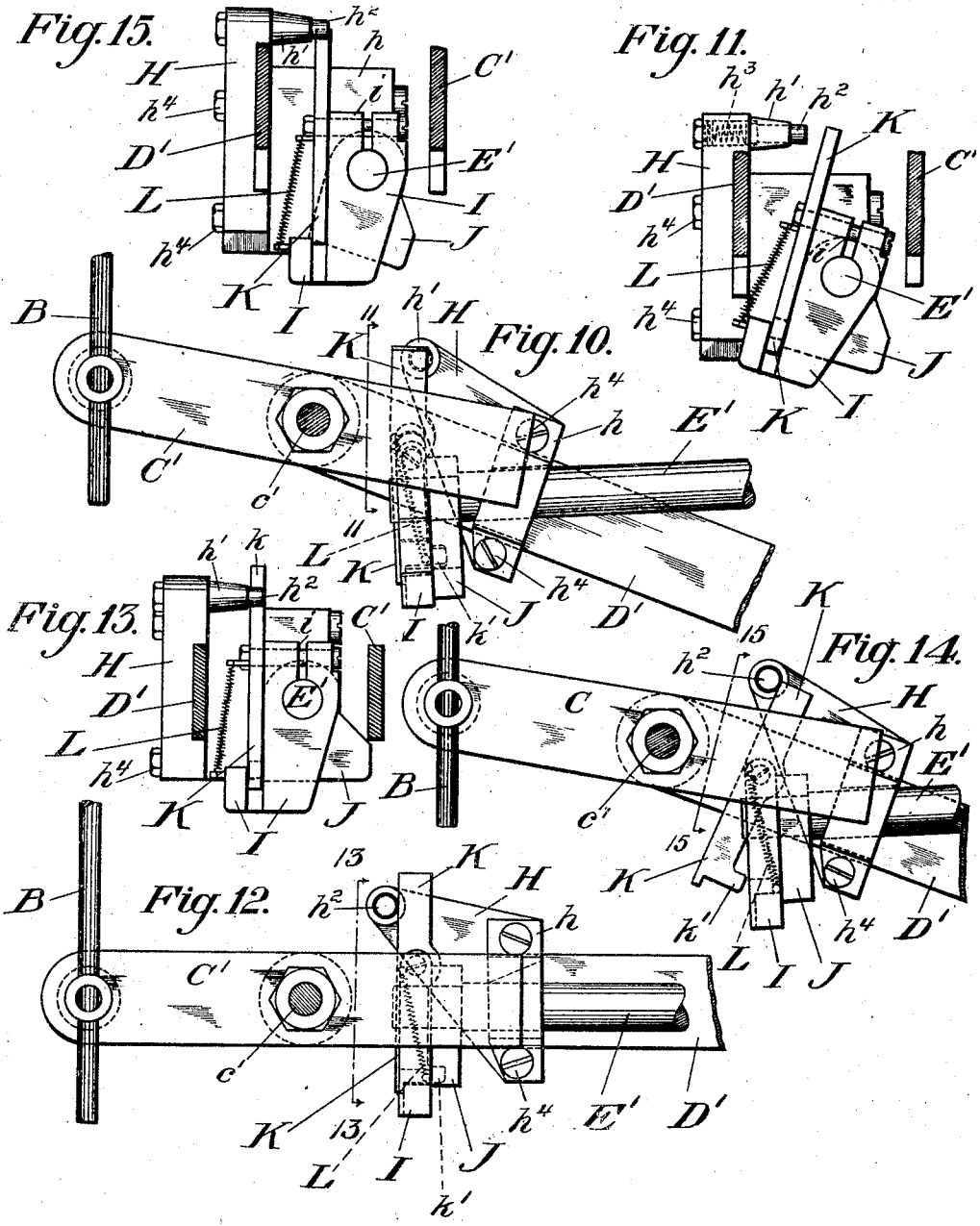

M. H. FLYNN.
CLUTCH OPERATING MECHANISM.
APPLICATION FILED JAN. 15, 1914.
1,180,709.
Patented Apr. 25, 1916.
4 SHEETS—SHEET 4.
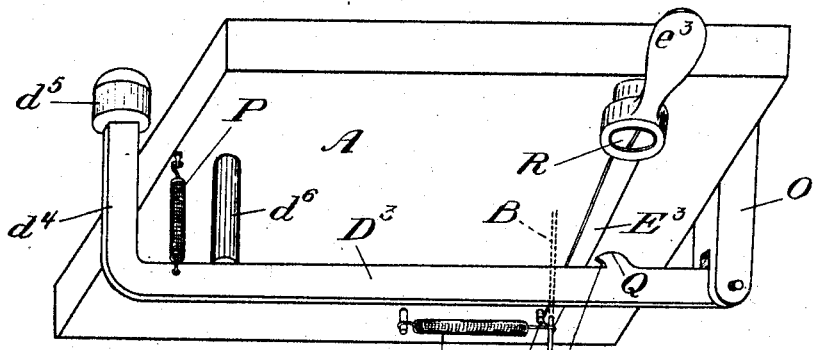
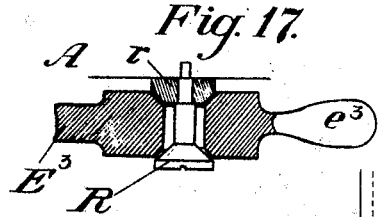
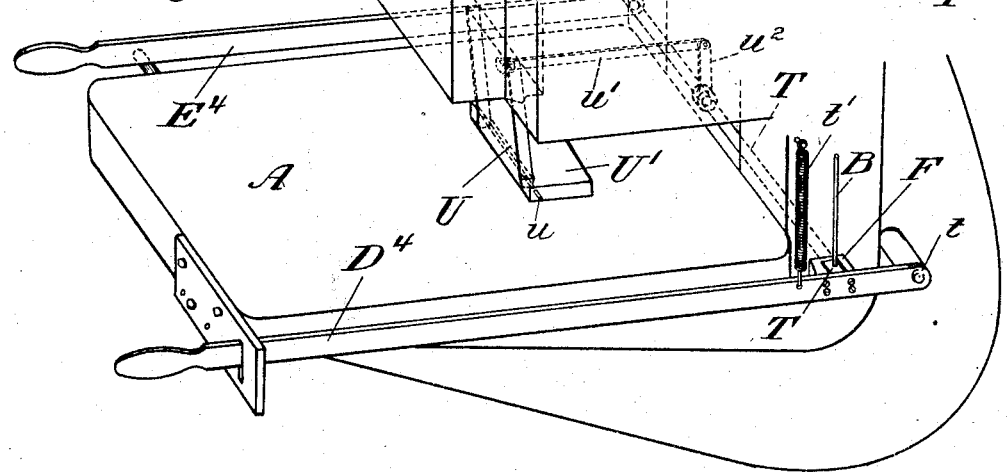
WITNESSES:
L. L. Browning
Florence Meisner
INVENTOR
Michael H. Flynn
BY Edward C. Davidson
ATTORNEY

UNITED STATES PATENT OFFICE.

MICHAEL H. FLYNN, OF HARTFORD, CONNECTICUT, ASSIGNOR TO ROYAL TYPEWRITER COMPANY, INC., OF NEW YORK, N. Y., A CORPORATION OF NEW YORK.

CLUTCH-OPERATING MECHANISM.

1,180,709.  Specification of Letters Patent.  Patented Apr. 25, 1916.

Application filed January 15, 1914. Serial No. 812,256.

*To all whom it may concern:*

Be it known that I, MICHAEL H. FLYNN, a citizen of the United States, residing in Hartford, in the county of Hartford and State of Connecticut, have invented certain new and useful Improvements in Clutch-Operating Mechanism, of which the following is a specification.

This invention relates particularly to that class of machines in which articles operated upon are placed by hand between moving parts and in which there is danger of injury to the operator should he place his hands between such parts while they are moving. Presses containing punching, cutting or forming dies are examples of this class of machines.

The object of this invention is to provide means for so controlling the operation of the machine that both hands of the operator are necessarily employed in setting the clutch mechanism so that the mechanism cannot be actuated unless both hands are occupied in starting the machine.

In carrying out my invention I provide two hand levers which are necessarily operated by both hands of the attendant and must be moved in a certain sequence in order to set the clutch and effect the starting of the machine. The arrangement is also such that the machine will be stopped should either hand be withdrawn from a lever during the operation. In this way it is made practically impossible for the operator to place his hands between the moving working parts of the machine.

In the accompanying drawings I have illustrated several embodiments of my invention.

Figure 1:
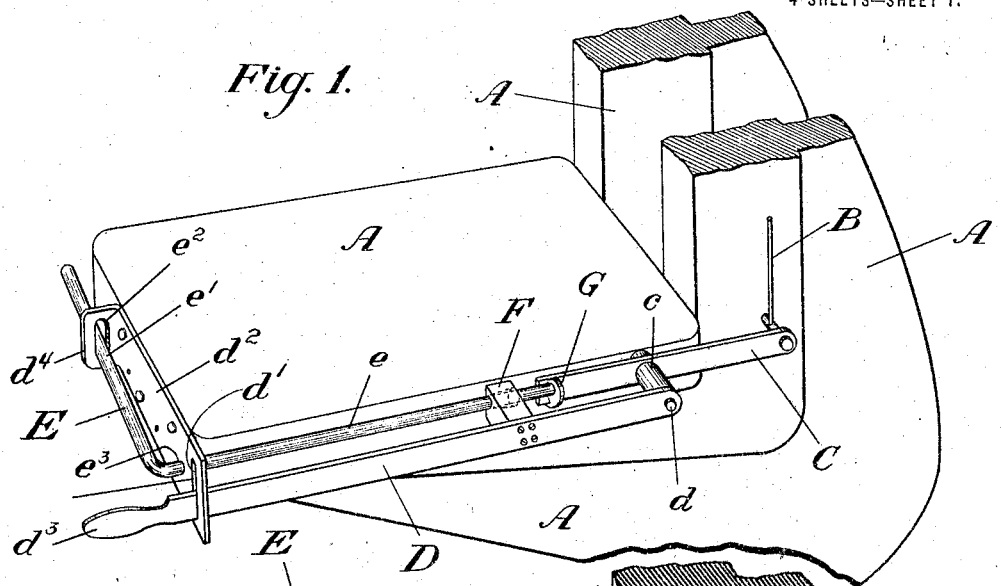
Figure 2:
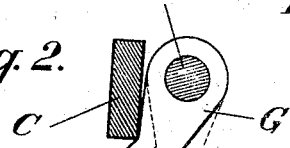
Figure 3:
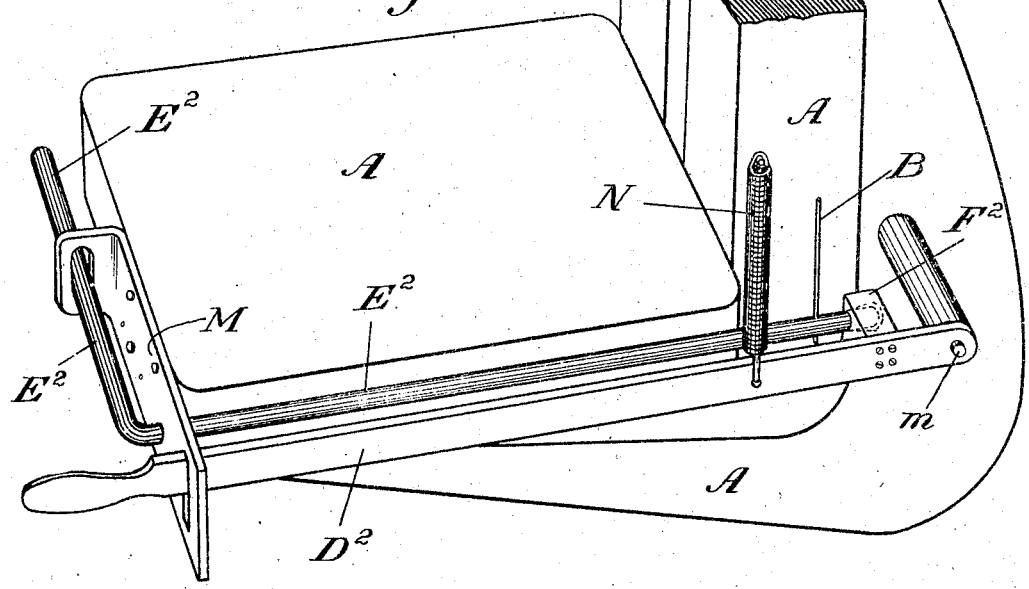

Figure 1 is a perspective view of part of a power press showing my improvements in a simple form applied thereto. Fig. 2 is a detail view of part of the mechanism shown in Fig. 1. Fig. 3 is a perspective view of part of a power press with a modified form of my improvements applied. Figs. 4 to 9 inclusive illustrate devices which may be employed for connecting the two levers for operating upon the clutch-operating mechanism, these devices differing somewhat from the mechanism shown in Figs. 1, 2 and 3, and they are of such nature that should the levers be operated in improper order the machine will stop and cannot be again started by the operation of the levers until certain devices carried thereby are properly set. Fig. 4 is a side elevation of parts of the two levers with certain devices carried thereby, the levers and associated parts being in the position which they occupy when the clutch is inoperative. Fig. 5 shows a cross section on the line 5—5 of Fig. 4 with the parts in the same position. Fig. 6 is a detail view similar to Fig. 4 but showing the position of the parts when the levers have been operated to set the clutch. Fig. 7 shows a section on the line 7—7 of Fig. 6, with the parts in the position shown in Fig. 6. Fig. 8 is a detail view showing the position of the parts should the levers be operated in improper sequence. Fig. 9 shows a section on the line 9—9 of Fig. 8. Figs. 10 to 15 inclusive are views similar to Figs. 4 to 9 inclusive but illustrate a modification. Fig. 10 shows a side elevation of parts of the two levers with devices associated therewith. Fig. 11 shows a cross section on the line 11—11 of Fig. 10. Fig. 12 is a detail view in side elevation showing the position of the parts when the levers have been operated to set the clutch. Fig. 13 shows a cross section on the line 13—13 of Fig. 12. Fig. 14 is a detail view showing the position of the parts should the levers be operated in improper sequence. Fig. 15 shows a transverse section on the line 15—15 of Fig. 14. Fig. 16 is a perspective view of a modified form of the invention. Fig. 17 shows a detail of the mechanism shown in Fig. 16. Fig. 18 is a perspective view of a further modification; and Fig. 19 is a detail view of certain parts of this mechanism.

In some presses the power shaft completes a full revolution when the clutch is once actuated. In others, should the clutch be released by an upward movement of the trip rod at any part of the revolution of the shaft, the movement of the press plunger is instantly arrested. The dies of whatever character are applied to the plunger in the usual way.

In the drawings I have shown my invention in such form as to operate on the clutch trip rod of a power press, part of which is indicated in several figures of the drawings by the letter A. This trip rod is indicated at B in the various illustrations. It may be assumed that when the rod is pulled downward it will cause the clutch to be set and the machine to be operated. The rod shown in Fig. 1 is connected to a lever C pivoted at $c$ to the frame of the press.

For operating the clutch mechanism I employ two levers indicated in Fig. 1 by the letters D and E and these levers are connected with each other and at times move together in a manner hereinafter described.

The lever D is pivoted at one end to the side of the press on a stationary stud-shaft $d$ on which the lever C is also pivoted. The outer portion of the lever D extends through a guide slot $d'$ in a guide plate $d^2$ and is provided on its outer end with a handle $d^3$.

The other lever E is L-shaped, one portion $e$ extending through an opening $e^3$ in the guide plate $d^2$ and also through a block F firmly attached to the inner portion of the lever D. At its extreme inner end the lever E carries a lifting pawl G which is adapted to engage the under side of the lever C. The other portion $e'$ of the lever E is disposed at right angles to the portion $e$ of this lever and extends through a guide slot $e^2$ in an extension $d^4$ of the guide plate $d^2$. The opening in the block F through which the lever E extends is of sufficient size to permit said lever to move to a small extent without binding.

Normally the levers D and E are depressed, their weight being sufficient to return them to this position when free and at this time the clutch is inoperative. When it is desired to set the clutch it is necessary to lift the levers in proper sequence,—if the lever D be first raised the clutch would not be operated because at this time the pawl G on the lever E is in the position shown by dotted lines in Fig. 2 and there is nothing on the lever D to engage the lever C. Any movement alone of the lever D upward or downward any number of times will not operate the clutch. But if when both levers are depressed, the lever E be first raised then the part $e$ of this lever will be turned around its longitudinal axis and the pawl G will be turned in such manner that its nose will extend below the lever C, as indicated by full lines in Fig. 2. Then if the lever D be raised it will, of course, lift the block F and will also lift the inner portion of the lever E and therefore the lever C will have its outer end elevated and its inner end depressed so as to operate upon the clutch trip rod B and thus set the clutch. It is necessary during this operation for one hand of the operator to raise the lever E to set the toe of the pawl G under the lever C and then when the other hand of the operator lifts the lever E, the clutch mechanism will be set and therefore it is impossible for the operator to place one or both of his hands between the punches or dies when the machine is in action. This safety apparatus is extremely simple but it is also very efficient.

In fast running presses it is practically impossible for the operator to put either hand under the moving plunger after the hands are removed from the levers, and ordinarily with proper care the mechanism shown in Fig. 1 will be found sufficient.

Slow running presses are preferably equipped with clutch devices adapted to be released and stop the press at any part of the revolution of the shaft should either hand be removed from the clutch-setting lever.

In Figs. 4 to 15 inclusive I have illustrated means for operating the clutch mechanism under all conditions and which insure the proper actuation of the clutch mechanism when the levers are properly operated in the proper sequence and which render the mechanism inoperative and prevent the actuation of the clutch mechanism if the levers are operated in improper sequence.

Figs 4 to 9 inclusive show one form of such mechanism and as this is a modification of the mechanism shown in Figs. 1 and 2 different reference characters are employed.

The clutch trip rod B is similar to that shown in Fig. 1 and it is connected with the lever C', also similar to the lever C, and this lever is pivotally connected with the press frame at $c'$. The lever D' is similar to the lever D before described and is pivotally connected to the press frame at $c'$. This lever D' carries on its inner portion near the pivot $c'$ a block H which is rigidly secured to the lever D' and has a lateral extension $h$ through which extends the inner portion of the lever E' similar to the lever E before mentioned. The block H and the extension $h$ may be made in two parts and clamped on the lever D' by clamping screws $h^4$. A portion of the block H extends above the lever D' and is provided with a hollow laterally projecting boss $h'$ which receives a pin $h^2$ pressed outward by a spring $h^3$ housed in a recess in said block H. Normally the pin is pressed outward as indicated in Fig. 7.

The inner end of the lever E' carries a head I which projects downwardly from it and is secured to it by the clamping devices $i$. Between the head I and the extension $h$ of the block H is mounted a lifting pawl J which is pivoted on the lever E'. This pawl is free to swing on its pivot and is adapted to engage the under side of the lever C', but it cannot so engage unless its outer movement away from the lever C' is properly limited as it is weighted at $j$ and if free it will swing so far away from the lever C' that it will not engage it when the lever E' is lifted and when the lever D' is operated.

In order to limit the inward movement of the lifting pawl away from the lever C', I employ a locking pawl K which is pivoted to the head I at $k$ and is provided with a lug $k'$ adapted to enter behind the inner edge of the lifting pawl and limit its inward movement. The locking pawl normally occupies this position and is normally held by its weighted end $k^2$, so that in the proper operation of the machine, i. e., when the lever $E'$ is first raised and then the lever $D'$, the clutch will be set and if the lever $E'$ be first lowered and then the lever $D'$ depressed the lifting pawl will not be disturbed and the operation may be continued. If the lever $D'$ is first raised the clutch will not be operated because the lifting pawl will not then be in position to engage the lever $C'$ and this lever $D'$ may be raised and lowered indefinitely without accomplishing any result. Whenever the two levers are properly raised in the manner before described the side of the upper portion of the pawl K is made to engage the spring-actuated pin $h^2$ and the pawl J is placed beneath the lever $C'$. When the lever $D'$ is raised the clutch is set and at the same time the pin $h^2$ jumps out and engages the rear edge of the locking pawl K. If now the lever $E'$ be first lowered the pawl K will move out of the path of the pin $h^2$ and the lever $E'$ may be freely lowered, but if when both levers have been properly raised, in the manner before described, with the pin $h^2$ behind the pawl K, the lever $D'$ is first lowered, then the pin $h^2$ will cause the pawl K to swing on its pivot and withdraw its lug $k'$ from behind the lifting pawl so that the latter will swing away from the lever $C'$ and prevent the return of the pawl to lifting position. Thereafter when it is again attempted to operate the machine even by a movement of the levers in the proper sequence the clutch-operated mechanism will not be actuated. It is first necessary to move the lifting pawl outward from its housing and allow the locking pawl K to move to its normal position with its lug $k'$ behind the edge of said lifting pawl.

Figs. 4, 5, 6, and 7 show the parts in proper working condition. In Figs. 4 and 5 the parts are shown in their normal inactive position with the locking pawl behind the lifting pawl. Figs. 6 and 7 show the position of the parts when both levers have been raised to their full extent, the lifting pawl engaging the lever $C'$ and the pin $h^2$ engaging the upper portion of the locking pawl K, and if the lever $E'$ is first lowered the lever $D'$ may then be lowered without disturbing the position of the locking pawl K.

Figs. 8 and 9 show the condition of the mechanism when the lever $D'$ has been improperly first lowered, and it will be observed that the pawl K has been withdrawn from behind the pawl J and the latter has moved inward to such an extent that when the lever $E'$ is next operated said lifting pawl will not engage the lever $C'$ and therefore the lever $D'$ when raised will not operate the clutch. In order to render the mechanism operative it is necessary to move the lifting pawl J outward and allow the pawl K to assume its proper position behind the lifting pawl.

It will therefore be understood that it is absolutely necessary, in order to operate the clutch, that the lever $E'$ shall be first operated and that in order to reverse this operation the same lever $E'$ must be first moved. If the lever $D'$ be first raised no movement will be transmitted to the clutch-operating mechanism and if, after proper movement of the levers, the lever $D'$ be improperly first lowered, the mechanism is so disturbed that thereafter the clutch cannot be again actuated until the mechanism is restored to its proper condition. It is obvious that the press cannot be operated should the lever $E'$ be tied up or otherwise held in upper position.

The devices shown in Figs. 10 to 15 of the drawings are practically the same as those shown in Figs. 4 to 9 except that the pawls J and K are not weighted and the pawl K is provided with a spring L which acts to return it to its normal position when moved therefrom.

Similar reference characters to those shown in Figs. 4 to 9 inclusive have been employed in Figs. 10 to 15.

The operation of the mechanism is precisely the same and it will be understood that the clutch spring of the press will, by acting on the trip rod B and lever $C'$, push the lifting pawl back when the finger $k'$ of the locking pawl K is moved from the rear edge of the lifting pawl. In this way the press clutch is allowed to return when the lever $D'$ is dropped before lever $E'$ is dropped.

Fig. 3 illustrates a simple construction embodying the general features of the invention in which the order of manipulation of the levers differs from that before described. In this instance I employ two levers $D^2$, $E^2$, as heretofore, but mount them and operate them in a somewhat different way. I employ a guide plate M, similar to the guide plate $d^2$ of Fig. 1, but in this case the lever $D^2$ is pivoted at its rear end to a stud $m$ projecting from the side of the press A. The inner end of the lever $E^2$ extends into a recess in a block $F^2$ secured to the lever $D^2$ near its inner end. The lever $D^2$ is normally held in an elevated position by a spring N and the clutch trip rod B passes through a hole in the lever $E^2$. When the outer end or handle of the lever $D^2$ is depressed, the rod B is not gripped, but when the lever $E^2$ is slightly turned a gripping action occurs between the rod B and said lever. In operating this mechanism the lever E² is first raised, thereby causing the rod B to be gripped and then the lever D² is depressed and the inner end of the lever E² is thus also depressed causing the rod B to be drawn downward, to set the clutch. When either hand is removed from a lever the clutch is released. The lever D² is raised when free by the spring N, and the lever E² moves to its normal position by gravity and when it so moves its grip on the rod B is released.

In Figs. 16 and 17 I have shown another form of the invention. In this case I employ two levers D³, E³ which are mounted beneath the bed of the press A. The form of these levers is somewhat different from those heretofore described, but the operation is similar in that one of the levers must be moved before the other in order to properly operate the starting and stopping mechanism and the removal of either hand of the operator from the levers will immediately allow the clutch to arrest the operation of the press. The lever D³ is pivotally connected at its inner end to a bracket O extending downwardly from the press and at its outer end this lever has an upwardly extending arm d⁴ provided with a handle d⁵. This lever is normally held up against a stop d⁶ by a spring P and has on its upper edge in its rear portion a lug Q formed with an angular reëntrant notch q. The lever E³ is formed with a handle e³ and it has a free pivotal connection with the bed of the press. This connection is formed by means of a set screw R having a large head with a tapered inner side and which extends through a wide opening into the lever and through a washer r having a tapered face which coöperates with a correspondingly formed recess in the lever E³. The tapered head of the stud fits a correspondingly shaped recess in the lever, while the washer r is firmly held against the bed of the press by the stud. This provides a construction whereby the lever E³ has freedom of movement in all necessary directions. The trip rod B is fastened to the inner end of the lever E³ and a spring S tends to hold the inner end of said lever against a stop s. At this time the lever is clear of the notched lug Q, as indicated in Fig. 16, and when the mechanism is in this condition the lever D³ may be moved without operating the clutch mechanism.

In order to start the press equipped with the mechanism just described, it is necessary to first move the lever E³ until it engages the lug Q and then if the lever D³ is depressed the lever E³ will be carried downward and operate the rod B. The angle of the notch q is such that the lever E³ must be held in said notch when the lever D³ is pressed downward so that both hands of the operator must be employed to effect the operation. The release of either hand from the levers permits the trip rod to move upward and release the clutch.

In Figs. 18 and 19 I have shown still another form of the invention. In this case I also employ two levers, but the inner end of the lever D⁴ is pivoted to a stud t and it is held in its upper position by a spring t'. The lever E⁴ is attached at its inner end to a rock shaft which passes transversely through the frame of the press and one end of this rod extends into a recessed block F⁴ attached to the lever D⁴. The shaft T has a vertical opening into or through which the lower end of the rod B extends. When the lever E⁴ is in its normal position the rod B is not gripped, but when the lever E⁴ is elevated the rock shaft T is turned and the rod B is firmly held thereby. This mechanism is operated by first raising the lever E⁴ and then depressing the lever D⁴. The rod B cannot be operated unless the lever E⁴ is first raised. I have also shown the press equipped with devices for at times supporting the tool-carrying part of the press plunger. This mechanism comprises a block U having a pivotal connection u at its lower end with a plate U' on the bed of the press. The upper end of the block U is by a link u' connected to an arm u² secured to the rock shaft T. When the press is at rest the upper end of the block U is under the plunger and the latter will be prevented from descending should the clutch be accidentally set for operation. The upward movement of the lever E⁴ removes the block U from beneath the plunger W, as shown by dotted lines in Fig. 19, and thus the press can descend when the rod B is properly operated. Each time that the lever E⁴ is raised the block U is withdrawn from under the plunger and each time that said lever is lowered the block assumes a position beneath the plunger.

In the illustrations of my invention shown and hereinbefore described, the trip rod B or the rod B and the lever C may be considered the means for starting and stopping the machine, while the two levers with their associated parts are the means for controlling the operation of said means.

As before stated, my improvements are especially adapted for use on power presses which are clutch-operated, but it is obvious that they may be applied to machines of other kinds.

I claim as my invention:

1. A safety device for power-operated machines, comprising means for starting and stopping the machine, two hand-operated levers one of which is adapted to operatively connect with said starting and stopping means, which is normally out of operative relation therewith, and which must be first moved by one of the hands of the operator, and means connecting the two levers whereby after the first lever is moved by one hand to bring it into operative relation with the starting and stopping means a movement of the other lever by the other hand of the operator will actuate the starting mechanism.

2. A safety device for power-operated machines, comprising means for starting and stopping the machine, two hand-operated levers one of which is adapted to operatively engage said means but is normally out of operative relation therewith and which must be first brought by one of the hands of the operator into position to operatively engage therewith, and a connection between the two levers whereby when one of said levers has been moved by one hand of the operator to bring it into operative relation with the starting and stopping means the movement of the other lever by the other hand of the operator will put the machine into operation.

3. A safety device for power-operated machines, comprising means for starting and stopping the machine, two hand-operated levers, a device carried by one of said levers adapted to engage said starting and stopping means, which is normally out of operative relation therewith, and which must be first brought by one hand of the operator into position to engage said means, and a connection between the two levers whereby when, after one of the levers has been moved by one hand of the operator to bring it into operative relation with the starting and stopping means and the second lever is moved by the other hand of the operator, the starting means will be operated.

4. A safety device for power-operated machines, comprising means for starting and stopping the machine, two hand-operated levers normally out of operative relation with said starting and stopping means, a connection between one of said levers and the starting and stopping means, and a connection between the two levers which after the lever connected with the starting and stopping means has been moved by one hand of the operator will cause the machine to be started when the second lever is moved by the other hand of the operator.

5. A safety device for power-operated machines, comprising means for starting and stopping the machine, two hand-operated levers, a pawl carried by one of said levers and adapted to engage said starting and stopping means, which is normally out of operative relation therewith, and which must be first brought into position to engage said means by one of the hands of the operator, and a connection between the two levers whereby after the first lever is moved by one hand to bring it into operative relation with the starting and stopping means and the second lever is moved by the other hand of the operator the starting and stopping means will be actuated.

6. A safety device for clutch-operated machines, comprising a clutch trip rod, two hand levers, a pawl carried by one of said levers and adapted to operate upon the clutch trip rod, but which is normally out of operative relation therewith and means connecting the two levers whereby after the first lever is moved by one hand a movement of the other lever by the other hand of the operator will actuate the starting means, the arrangement being also such that the release of either hand lever will also release said trip rod.

7. A safety device for power-operated machines, comprising means for starting and stopping the machine, two hand levers, a lifting pawl carried by one of said levers, a locking pawl for limiting the movement of said lifting pawl, means connecting the two levers whereby after one lever is moved by one hand, a movement of the other lever by the other hand of the operator will actuate the starting means, and devices for withdrawing the locking pawl from its normal position if the levers are improperly operated.

8. A safety device for power-operated machines, comprising means for starting and stopping the machine, two hand-operated levers, a lifting pawl carried by one of said levers, a locking pawl carried thereby for limiting the movement of the lifting pawl, a device carried by said last mentioned lever for moving said locking pawl out of its normal position should the levers be improperly operated, and means connecting the two levers whereby after the first lever is moved by one hand a movement of the other lever by the other hand of the operator will actuate the starting mechanism.

9. A safety device for power-operated machines, comprising a clutch trip rod, a lever to which it is connected, two hand-operated levers, a lifting pawl carried by one of said levers and adapted to engage the lever to which the trip rod is connected, a locking pawl for limiting the movement of the lifting pawl, and means connecting the two levers whereby after the first lever is moved by one hand a movement of the other lever by the other hand of the operator will cause said lifting pawl to engage said trip rod lever and actuate the mechanism.

10. A safety device for power-operated machines, comprising means for starting and stopping the machine, a hand lever, a pawl carried thereby normally out of operative relation with the starting and stopping means, a locking pawl for holding the first mentioned pawl in its normal position, another hand lever operatively connected with the first mentioned lever and which when the first mentioned lever has been moved to bring its pawl into operative relation with the starting and stopping means causes said pawl when said second lever is operated to engage and actuate the starting and stopping means, and means carried by said second lever for at times releasing the locking pawl and causing the first mentioned pawl to move out of normal position.

11. A safety device for power-operated machines, comprising means for starting and stopping the machine, a hand lever, a lifting pawl carried thereby, a locking pawl for normally holding the lifting pawl in its normal position, another hand lever operatively connected with the first mentioned hand lever to move it and cause its lifting pawl to engage and operate the starting and stopping means, and means carried by said second mentioned hand lever for withdrawing the locking pawl from engagement with the lifting pawl when the levers are improperly operated.

12. In an apparatus of the character described, in combination with means for controlling a power supply, a primary manually operated lever for actuating the controlling means, and a secondary manually operated lever for controlling the operation of said first mentioned lever, both said levers being arranged to require consecutive movement into operative position before said operating means may be actuated.

13. In an apparatus of the character described, in combination with means for controlling a power supply, a primary manually operated lever for actuating the controlling means, and a secondary manually operated lever for controlling the operation of said first mentioned lever, both said levers being arranged to require consecutive movement into and out of operative position in beginning and repeating the actuation of said power operating means.

14. In an apparatus of the character described, in combination with means for controlling a power supply, a primary manually operated lever for actuating the controlling means, and a secondary manually operated lever for controlling the operation of said first mentioned lever, said secondary lever being arranged to require restoration to normal position before the operation of said primary lever may be repeated.

15. In an apparatus of the character described, in combination with means for controlling a power supply, a primary manually operated lever for actuating the controlling means, and a secondary manually operated lever arranged to require alternate movement relatively to the primary lever for controlling the operation of said first mentioned lever, said primary lever being inoperative except when said secondary lever is in operative position.

In testimony whereof, I have hereunto subscribed my name.

MICHAEL H. FLYNN.

Witnesses:
GEORGE HONKE,
MAY P. FITZGERALD.